United States Patent [19]
Kamarei

[11] Patent Number: 4,749,522
[45] Date of Patent: Jun. 7, 1988

[54] SUPERCRITICAL FLUID EXTRACTION OF ANIMAL DERIVED MATERIALS

[75] Inventor: Ahmad R. Kamarei, Arlington, Mass.

[73] Assignee: Angio-Medical Corporation, New York, N.Y.

[21] Appl. No.: 793,622

[22] Filed: Oct. 31, 1985

[51] Int. Cl.$^4$ .................. C11B 1/10; A61K 35/12; A61K 35/14; A61K 35/38
[52] U.S. Cl. ........................... 260/412.8; 424/95; 424/101; 424/104; 424/105; 424/108; 424/110; 424/111; 424/112; 514/78; 514/169; 514/358; 514/558; 514/573
[58] Field of Search ............. 280/412.8; 424/95, 101, 424/104, 105, 108, 110–112; 514/169, 358, 558, 573, 78

[56] References Cited

U.S. PATENT DOCUMENTS

| | | | |
|---|---|---|---|
| 4,247,570 | 1/1981 | Zosel | 426/481 |
| 4,251,559 | 2/1981 | Margolis et al. | 426/490 |
| 4,255,458 | 3/1981 | Roselius et al. | 426/424 |
| 4,255,461 | 3/1981 | Jasovsky et al. | 426/595 |
| 4,280,961 | 7/1981 | Schneider et al. | 260/412.8 |
| 4,331,695 | 5/1982 | Zosel | 426/430 |
| 4,348,422 | 9/1982 | Zosel | 426/475 |
| 4,466,923 | 8/1984 | Friedrich | 260/412.4 |

FOREIGN PATENT DOCUMENTS 58-14444 8/1984 Japan.

OTHER PUBLICATIONS

Hyatt, J. Org. Chem. 49: 5097–5101 (1984).
Krukonis et al., J. Phys. Chem. 88: 2687–2689 (1984).
Coenen et al., Ger. Chem. Eng. 7: 335–344 (1984).
Abelson, Science 221: (Aug. 26, 1983).
Peter, Fette Seifen Anstrichmittel 4: 135 (1983).
Chemical and Engineering News, Sep. 12, 1983, p. 45.
Brogle, Chem. and Ind., Jun. 19, 1982, pp. 385–390.
Bott, Chem. and Ind. (Jun. 19, 1982), pp. 394–396.
Borman, Anal. Chem. 53(11): 1201A (1981).
Worthy, Chem. and Eng. News (Aug. 3, 1981), pp. 16–17.
Christianson et al., J. Food Sci. 49: 229–233, (1984).
Snyder et al., JAOCS 61: 1851–1956 (Dec. 1984).
Bulley et al., JAOCS 61: 1362–1365 (Aug. 1984).
Friedrich et al., JAOCS 61: 223–228 (Feb. 1984).
Johnson, Food Engineering News, pp. 1, 8–10, 15 (Nov. 1983).
Brannolte et al., Chem. and Phys. Lipids 33: 297–299 (1983).
Quirin, Fette Seifen Anstrichmittel 84: 460 et seq. (1982).
Friedrich et al., JAOCS 59: 288–292 (Jul. 1982).
Gardner, Chem. and Ind. (Jun. 19, 1982), pp. 402–405.
Calame et al., Chem. & Inc. (Jun. 19, 1982), pp. 399–402.
Vollbrecht, Chem. & Ind., Jun. 19, 1982 (pp. 397–399).
de Filippi, Chem. & Ind., Jun. 19, 1982 (pp. 390–394).
Friedrich et al., J. Agr. & F. Chem. (Jan.–Feb. 1982), pp. 192–193.
Stahl, Fette Seifen Anstrichmittel 83: 472–474 (1981).
Stahl, Natur Wissenschaften 71: 181–191 (1982).
Kufman et al., Milchwissenschaft 37(2): 92–96 (1982).
Stahl, Fette Seifen Anstrichmittel 84(11): 444–451 (1982).
Stahl et al., Chem. and Phys. Lipids 31: 319–324 (1982).
Stahl et al., Agr. & F. Chem. 28: 1153–1157 (1980).

Primary Examiner—John Rollins
Attorney, Agent, or Firm—Felfe & Lynch

[57] ABSTRACT

Supercritical fluids (SCF) are found to be useful in extracting desired materials from animal tissues, cells, and organs. By varying the choice of SCF, experimental conditions, and animal source material, one may obtain lipids, proteins, nucleotides, saccharids, and other desirable components or remove undesirable components.

57 Claims, 2 Drawing Sheets

SUPERCRITICAL FLUID EXTRACTION OF ANIMAL DERIVED MATERIALS

FIELD OF THE INVENTION

This invention relates to the field of extraction of desired materials from complex components of which the desired material is a part. In particular, the invention relates to extraction via supercritical or subcritical fluids. These fluids are used to extract desired materials from animal tissues, cells, and organs.

BACKGROUND

Supercritical fluids (SCF), have received, and continue to receive attention. Briefly defined, a supercritical fluid is a gas, subjected to temperatures and pressures over limits known as Critical Pressure (Pc), and Critical Temperature (Tc). Above these points, the SCFs have different properties than they possess in the gaseous state. FIG. 1 shows a graph of supercritical conditions for one gas, $CO_2$. Different conditions are necessary to form other supercritical fluids, as may be seen, e.g., in Table 7, infra.

One property typical of SCFs is increased solvation power. It is known that, at temperatures and pressures above Pc and Tc, the SCFs extract materials otherwise removable only by toxic, prohibitively expensive, or inefficient means. For example, various chemical solvents, such as chloroform and methanol have been used. While the use of these products does give good results, the concern is, and has been, that residues of the solvent are either toxic per se or are promoters of diseases (e.g., they may be carcinogenic).

SCF extraction has been particularly useful for obtaining aromatic and lipid components from plant tissues. For example, the oil industry relies extensively on processes by which vegetable oils, such as soybean, cottonseed and corn oils, are removed from their vegetative components. The coffee industry uses supercritical processes for removing caffeine from coffee, and flavor extraction using SCFs has been applied to, e.g., hops, vegetables, fruits (lemons), and spices. As might be expected from the use of SCFs as flavor extractors, they have been used to extract fragrances as well.

It is important to note that, while SCFs have been and are used extensively for vegetable and seed extraction, no one has used the process for extraction of components from animal materials, such as organs, tissues, or cells.

It is desirable to have an effective method of extraction for animal tissues, because of the usefulness of the material obtained. Just in the field of lipid containing molecules, animal tissues contain angiogenic factors, hormones, regulatory molecules, and so forth. Lipid rich organs, such as liver, brain, kidney, and epithelial tissues, are rich sources of necessary and desirably biological products. A method of extracting these, via supercritical processes, has been heretofore lacking.

Hence it is an object of this invention to provide a method of obtaining desired components of animal tissues, cells, and organs, using supercritical fluids.

It is a further object of the invention to obtain complex and simple animal derived lipid containing materials by supercritical processes.

It is a still further object of this invention to obtain amino acid, nucleotide, saccharide containing materials as well as other molecules, using supercritical processes.

How these and other objects of the invention are achieved will be seen by reviewing the materials which follow.

PRIOR ART

Supercritical gas extraction has been known to the art for a long time. Its applications have been limited, however, to uses on plant tissue. Stahl, et al, *Agricultural and Food Chemistry* 28:1153-1157 (1980), describes extraction of seed oils (e.g., soybean oil), using supercritical $CO_2$. The pressures described range from 350–700 bar, and temperatures ranging from 20°–40° C. Only soybean, sunflower seed, and rapeseed are extracted by the process, and under the conditions given supra. In *Chemistry and Industry* (June 19, 1982), pp. 399–402, Calame et al describe isolation of fragrance and flavor extracts, using supercritical $CO_2$. Extraction is limited to lilac (34° C., 90 bar); lemon peel (40° C., 300 bar); black pepper (60° C., varied pressure); and almonds (40° C., 600 bar). It is noted that Calmane et al state that the art has room for development (pg. 401).

The *Federal Register*, 48:57269 (No. 251, Dec. 29, 1983), indicates that the Food and Drug Administration (FDA) has affirmed $CO_2$, $N_2$, He, $C_3H_8$, $C_4H_{10}$, iso-$C_4H_{10}$, and $N_2O$ as safe, human food ingredients. This report goes on to indicate that the FDA will consider regulations regarding supercritical $CO_2$, at a later date.

Some further applications of supercritical $CO_2$ are noted in Vollbrecht, *Chemistry and Industry* 19:397-399 (June, 1982) (hops extracted, no pressure or temperature data given). Friedrich, et al, *JAOCS* 59(7):288-292 (1982) (soybeans, hexane or $CO_2$ used); Fillippi, *Chemistry and Industry* 19:390-394 (June, 1982) ($CO_2$ solvent properties; no teaching of extraction); Johnson, *Food Engineering News* (pp. 1, 8-10, 15) (November 1983), (cottonseed oil extraction); Friedrich, et al *JAOCS*:61(2) 223-228 (soybean extraction); Bulley, et al *JAOCS* 61:8:1362-1365 (August, 1984) (canola seed extraction); Christianson, et al., *J. Food Sci* 49:229-232 (1984) (corn germ extraction); Snyder, et al *JAOCS* 61(12) (December, 1984) (soybean extraction); Friedrich, et al, *J. Agr. & Food Chem* (January-February 1982) pp. 192-193 (soybean extraction). Patents have issued, in particular to supercritical extraction of coffee beans. In this regard, see Jasovsky, et al, U.S. Pat. No. 4,255,461 (60°-100° C., 200 atm); Roselius, et al, U.S. Pat. No. 4,255,458 ($CO_2$, $N_2O$, $SF_6$, Xe, $CF_4$, $CH_4$, $C_2H_6$, $C_2H_4$, cyclo-$C_3H_8$, 50–300 bar pressure); Margolies, et al, U.S. Pat. No. 4,251,559 (70°–92° C., 175–600 bar); Zasel, U.S. Pat. No. 4,247,570 (decaffeination, 32° C.–140° C., 75–350 atm).

Two U.S. patents have issued on the use of supercritical gas as applied to animal tissue. Schneider, et al, in U.S. Pat. No. 4,280,961, describe a process whereby animal fats are separated from meat by products such as offal, scrap fat, and so forth. The method applies, e.g., to extracting purified suet or lard-like material, but does not teach purified lipids or lipid containing materials. As is known in the art, while fats contain lipids, the two are not equivalent. Schneider does not provide any parameters for extraction.

Friedrich, U.S. Pat. No. 4,466,923, teaches application of temperatures in excess of 60° C., and pressures in excess of 550 bar to obtain lipids from lipid containing materials. The only examples given, however, are vegetable seeds. At the pressure and temperature ranges specified, one skilled in the art would expect more delicate animal materials to disintegrate.

Hence the art shows no teaching or suggestions that supercritical gas extraction may be used to obtain desirable lipid containing materials from animal tissues, cells, and organs. As the example given in the following Detailed Description of Preferred Embodiments show, this is now possible.

DETAILED DESCRIPTION OF PREFERRED EMBODIMENTS

SAMPLES

Six samples were chosen for analysis: homogenates of porcine adipose tissue, porcine omentum and bovine omentum, and "CMFr" extracts of each of these.

Homogenate samples were prepared by addition of distilled water in twice the volume of tissue. Homogenization was accomplished by centrifuging (22,000 rpm for 90 seconds), followed by freeze drying overnight. Chloroform-Methanol fraction (CMFr) samples were prepared by adding 4 times the volume of Phosphate Buffered Saline solution (PBS), with homogenization and centrifuging as detailed supra. This produces a lipid cake which is then recovered and extracted wtih 10 times the volume of chloroform/methanol solvent (2:1, v/v). Centrifugation and evaporation of the solvent follows, with recovery of the filtered, viscous supernatant.

APPARATUS

Figure 1:
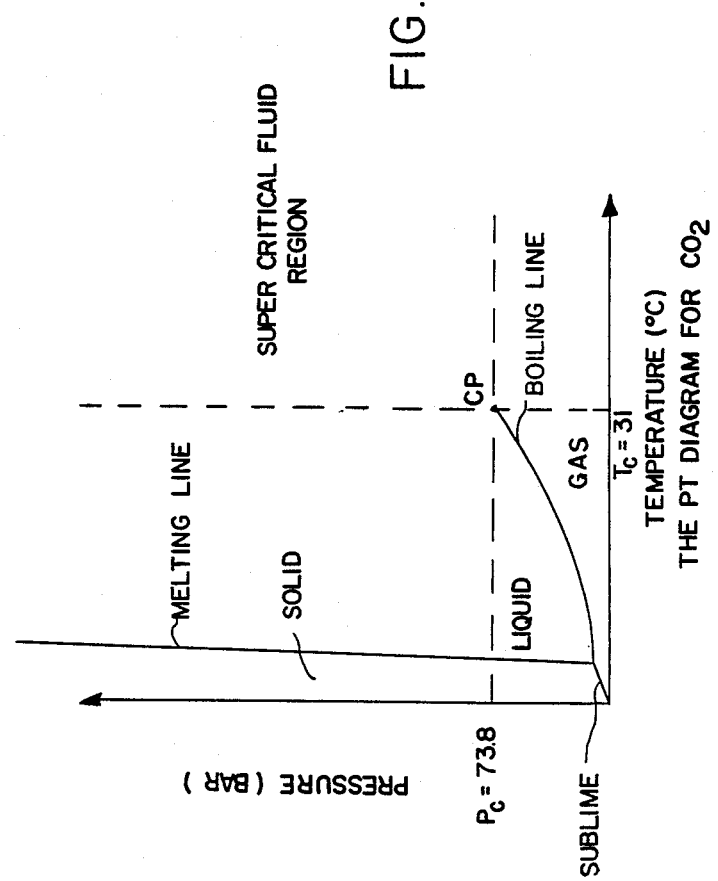
FIG. 1 is a graphic depiction of phase changes in a gas ($CO_2$), with a description of the conditions at which the gas becomes a supercritical fluid (SCF).
Figure 2:
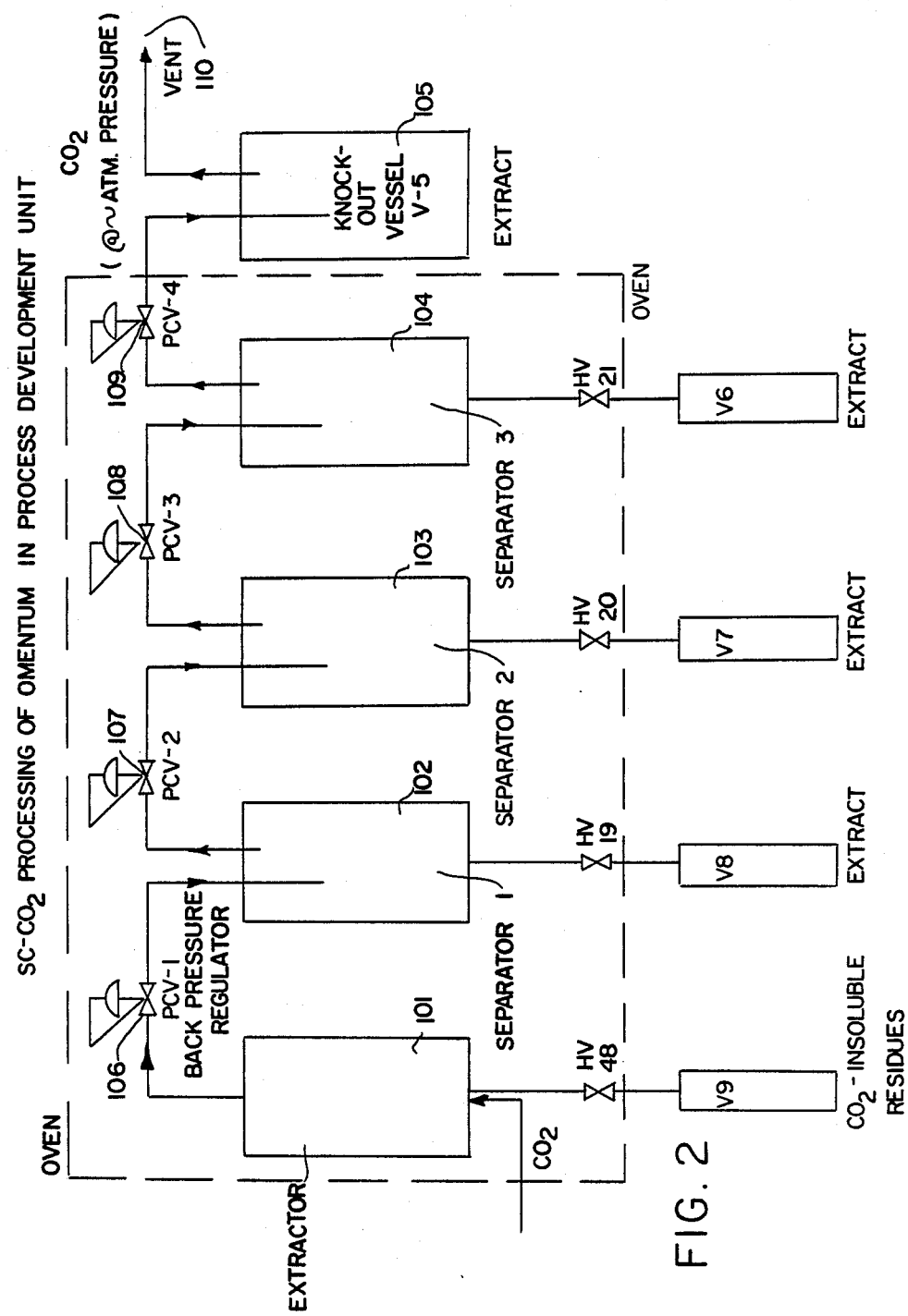
FIG. 2 shows an exemplification of an extraction of apparatus for use in extracting desired materials from animal derived products.

A process development unit (PDU) as shown in FIG. 2, is used. Briefly, the PDU consists of an extractor and three separators, which are housed in an oven at a predetermined temperature. A supercritical solvent, in this case, $CO_2$, is pumped into the extractor (101) and then flows, sequentially, through separators (102, 103, 104), and the "knock out" vessel (105). Pressure is maintained by back pressure regulators (106–109). Gas, e.g., $CO_2$, at approximately normal atmospheric pressure, exits the vent (110), when the extraction is completed.

EXAMPLE 1

Samples were melted in a separate, nitrogen purged oven at about 40° C., and then transferred into the extractor (101).

The vessels (102–104), were purged with low pressure $CO_2$, and were then brought to the temperatures and pressures indicated in Tables 1-6. $CO_2$ was then pumped at a rate of about 0.3 lb/min through the system until a weight of about 200 times the sample weight was pumped. Pressure was bled, and samples in each of the vessels and extractor were removed, weighed, and analyzed.

In these experiments, it was observed that close to, and above the critical point of the $CO_2$ used, dissolving power increased with an increase in temperature, at constant density and with increased density at constant temperature. For example, a portion of the sample, dissolved in the extractor at 3500 psigs, precipitates out at 1500 psigs in the first separator vessels. Further reductions in pressure/density cause additional fractions to precipitate out, until, at ambient pressure, the supercritical gas contains no dissolved material.

The residues obtained from the extractor were found to be insoluble in $CO_2$. Polar portions of the material, such as gangliosides, were expected to remain in the fraction, while extract fractions were expected to be rich in neutral, non-polar components. This has been observed to be the case, as the insoluble residue is found to contain polar materials, such as gangliosides, while non-polar materials, such as triglycerides, are found in the extracts.

While a single extractor, 3 separators and collecting vessels, and 1 knock out vessel are used in this embodiment, one skilled in the art will recognize that the number and combinations of each of these is a matter of design choice.

POLAR NON-POLAR

TABLE 1

| Material: Porcine Homogenized Adipose Tissues | | | | |
|---|---|---|---|---|
| CONDITIONS | | | | |
| Sample Weight Charged: | 131.3 gm | | | |
| Supercritical Solvent: | $CO_2$ | | | |
| Solvent Recirculated: | 57.8 lbs | | | |
| Solvent to Feed Ratio: | 200/1 | | | |
| Solvent Flow Rate: | 0.3 lb/min. | | | |
| | Extractor | Separator #1 | Separator #2 | Separator #3 | V5 |
| Temperature (°C.) | 38–39 | 40 | 37 | 33 | — |
| Pressure (psig) | 3500 | 1500 | 1300 | 1100 | 5 |
| Density (gm/cc.) | 0.87 | 0.69 | 0.62 | 0.26 | |
| MATERIAL BALANCE | | | | |
| Total Recovered (grams): | 99.1 | | | |
| % Recovery: | 75.5 | | | |
| | V9 | V8 | V7 | V6 | V5 |
| Weight (grams) | 7.7 liq 18.7 solid | 63.9 | 5.3 | 1.3 | 2.2 |
| Weight (% of feed) | 5.9 liq 14.2 solid | 48.7 | 4.0 | 1.0 | 1.7 |

*Comments: V9 solids were tissue like and cream color

TABLE 2

| Material: Porcine Adipose Tissue CMFr Extract | | | | |
|---|---|---|---|---|
| CONDITIONS | | | | |
| Sample Weight Charged: | 106.5 gm | | | |
| Supercritical Solvent: | $CO_2$ | | | |
| Solvent Recirculated: | 46.9 lbs | | | |
| Solvent to Feed Ratio: | 200/1 | | | |
| Solvent Flow Rate: | 0.3 lb/min. | | | |
| | Extractor | Separator #1 | Separator #2 | Separator #3 | V5 |
| Temperature (°C.) | 38–39 | 40 | 37 | 33 | — |
| Pressure (psig) | 3500 | 1500 | 1300 | 1100 | 5 |
| Density (gm/cc.) | 0.87 | 0.69 | 0.62 | 0.26 | |
| MATERIAL BALANCE | | | | |
| Total Recovered (grams): | 81.6 | | | |
| % Recovery: | 76.6 | | | |
| | V9 | V8 | V7 | *V6 | *V5 |
| Weight (grams) | 11.4 | 58.5 | 10.0 | 0.7 | 1.0 |
| Weight (% of feed) | 10.7 | 54.9 | 9.4 | 0.7 | 0.9 |

*Comments: V9 very viscous, off-white color
*Washed from vessel with Hexane, evaporated off but may be residual

TABLE 3

| Material: Porcine Homogenized Omentum |  |
|---|---|
| CONDITIONS |  |
| Sample Weight Charged: | 109.6 gm |
| Supercritical Solvent: | $CO_2$ |

TABLE 3-continued

Material: Porcine Homogenized Omentum

Solvent Recirculated: 48.3 lbs
Solvent to Feed Ratio: 200/1
Solvent Flow Rate: 0.3 lb/min.

|  | Extractor | Separator #1 | Separator #2 | Separator #3 | V5 |
|---|---|---|---|---|---|
| Temperature (°C.) | 38–39 | 40 | 37 | 34 | — |
| Pressure (psig) | 3500 | 1500 | 1300 | 1100 | 5 |
| Density (gm/cc.) | 0.87 | 0.69 | 0.62 | 0.26 |  |

MATERIAL BALANCE

Total Recovered (grams): 82.3
% Recovery: 75.1

|  | V9 | V8 | *V7 | V6 | V5 |
|---|---|---|---|---|---|
| Weight (grams) | 36.7 solids | 38.6 | 1.2? | 4.1 | 1.7 |
| Weight (% of feed) | 33.5 | 35.2 | 1.1 | 3.7 | 1.6 |

*Comments: V9 solids tissue-like
V8 clean white solid melted @ 45° C.
*Washed from vessel with Hexane, evaporated off but may be residual

TABLE 4

Material: Porcine Omental CMFr

CONDITIONS

Sample Weight Charged: 154.3 gm
Supercritical Solvent: $CO_2$
Solvent Recirculated: 68 lbs
Solvent to Feed Ratio: 200/1
Solvent Flow Rate: 0.3 lb/min.

|  | Extractor | Separator #1 | Separator #2 | Separator #3 | V5 |
|---|---|---|---|---|---|
| Temperature (°C.) | 38–39 | 40 | 40 | 35 | — |
| Pressure (psig) | 3500 | 1500 | 1300 | 1100 | 5–10 |
| Density (gm/cc.) | 0.87 | 0.69 | 0.50 | 0.25 |  |

MATERIAL BALANCE

Total Recovered (grams): 124.9
% Recovery: 80.9

|  | *V9 | V8 | V7 | V6 | V5 |
|---|---|---|---|---|---|
| Weight (grams) | 7.0 | 97.7 | 12.6 | 7.6 | 0.0 |
| Weight (% of feed) | 4.5 | 63.3 | 8.2 | 4.9 | 0 |

*Comments:
*Washed from vessel with Hexane, evaporated off but may be residual

TABLE 5

Material: Bovine Homogenized Omentum

CONDITIONS

Sample Weight Charged: 114.9 gm
Supercritical Solvent: $CO_2$
Solvent Recirculated: 50.6 lbs
Solvent to Feed Ratio: 200/1
Solvent Flow Rate: 0.3 lb/min.

|  | Extractor | Separator #1 | Separator #2 | Separator #3 | V5 |
|---|---|---|---|---|---|
| Temperature (°C.) | 38–39 | 40 | 40 | 35 | — |
| Pressure (psig) | 3500 | 1500 | 1300 | 1100 | 5–10 |
| Density (gm/cc.) | 0.87 | 0.69 | 0.50 | 0.25 |  |

MATERIAL BALANCE

Total Recovered (grams): 83.4
% Recovery: 72.6

|  | V9 | V8 | V7 | V6 | V5 |
|---|---|---|---|---|---|
| Weight (grams) | 31.4 gm tissue 6.2 fat | 28.3 | 5.2 | 12.3 | 0 |
| Weight (% of feed) | 27.3 tissue 5.4 fat | 24.6 | 4.5 | 10.7 | — |

TABLE 6

Material: Bovine Omental CMFr

CONDITIONS

Sample Weight Charged: 155.4 gm
Supercritical Solvent: $CO_2$
Solvent Recirculated: 68.5 lbs
Solvent to Feed Ratio: 200/1
Solvent Flow Rate: 0.3 lb/min.

|  | Extractor | Separator #1 | Separator #2 | Separator #3 | V5 |
|---|---|---|---|---|---|
| Temperature (°C.) | 38–39 | 40 | 40 | 35 | — |
| Pressure (psig) | 3500 | 1500 | 1300 | 1100 | 5–10 |
| Density (gm/cc.) | 0.87 | 0.69 | 0.50 | 0.25 |  |

MATERIAL BALANCE

Total Recovered (grams): 102.4
% Recovery: 65.9

|  | V9 | V8 | V7 | V6 | V5 |
|---|---|---|---|---|---|
| Weight (grams) | 3.8 | 75.0 | 15.8 | 7.8 | 0 |
| Weight (% of feed) | 2.4 | 48.3 | 10.2 | 5.0 | 0 |

EXAMPLES 2-18

The procedure of Example 1 is used to extract desired components found in other animal tissues, organs and cells. For example, central nervous system tissues and organs (brain, spinal cord, spinal fluid, appendages); peripheral nervous system tissues and organs (cranial nerves, spinal nerves, etc); myocardial and vascular tissues and organs (heart, arteries, and veins); circulatory tissues and organs (blood, erythrocytes, leukocytes, platelets, plasma); lymphatic system tissues and organs (lymph nodes, spleen, thymus); respiratory system tissues and organs (upper respiratory tract, lungs); digestive system tissues and organs (including mouth, teeth, tongue, salivary glands, pharynx, esophagus, peritoneum, stomach, small and large intestine, liver, gall bladder, pancreas); skeletal tissue and organs (axial and appendicular skeleton, bone marrow); muscles (smooth and skeletal); endothelial and epithelial tissue; membranes, omentum, and cartiligenous tissues (tendons, ligaments, joints); sensory organs (eyes, ear, nose, tongue); endocrine or other glandular tissue (thyroid gland, parathyroid gland, pituitary gland, adrenal gland); urinary tissue and organs (kidneys, ureters, urinary bladder, urethra); reproductive organs and tissues (testes, ovaries, etc.); and adipose tissues such as is contained in subcutaneous and internal organs, as well as biological exudates, such as feces, urine, sweat, semen, milk, and so forth, are used. In each case, a supercritical fluid is chosen which, at supercritical conditions, removes the desired component or components (e.g., lipid containing molecular proteins, etc), with minimal harm to the resulting extract.

EXAMPLES 19-66

The following gases (Table 7) are used in supercritical extraction processes on the materials described in Examples 1-18. Not all of the gases are desirable for each tissue and each desired extract. For example, if the critical temperature is above the temperature at which a desirable extract is functional, that gas is not used. For one skilled in the art, however, it is an easy task to determine which gas is appropriate or desirable, based upon the known properties of tissue and desirable components as well as the gas specifications, including supercritical temperatures and pressures.

TABLE 7

| | SYMBOL | CRITICAL TEMP. (°C.) | CRITICAL PRESSURE (atm.) |
|---|---|---|---|
| (A) ELEMENTALS | | | |
| (a) Noble gases: | | | |
| (1) Helium | He | −267.9 | 2.26 |
| (2) Neon | Ne | −228.7 | 27.9 |
| (3) Argon | Ar | −122.3 | 48.0 |
| (4) Krypton | Kr | −63.8 | 54.3 |
| (5) Xenon | Xe | 16.6 | 58.0 |
| (b) Others: | | | |
| (6) Nitrogen | $N_2$ | −147.0 | 33.5 |
| (7) Hydrogen | $H_2$ | −239.9 | 12.8 |
| (8) Oxygen | $O_2$ | −118.4 | 50.1 |
| (9) Ozone | $O_3$ | 12.0 | 55.0 |
| (10) Fluorine | $F_2$ | −129 | 55 |
| (B) INORGANIC COMPOUNDS (examples) | | | |
| (1) Ammonia | $NH_3$ | 132.5 | 112.5 |
| (2) Boron Trifluoride | $BF_3$ | −12.26 | 49.2 |
| (3) Carbon Dioxide | $CO_2$ | 31.0 | 72.9 |
| (4) Carbon Monoxide | CO | −140 | 34.5 |
| (5) Hydrogen Chloride | HCl | 51.4 | 82.1 |
| (6) Hydrogen Sulfide | $H_2S$ | 100.4 | 88.9 |
| (7) Nitric Oxide | NO | −93 | 64 |
| (8) Nitrogen Dioxide | $NO_2$ | 157.8 | 100 |
| (9) Nitrous Oxide | $N_2O$ | 36.5 | 71.7 |
| (10) Silane | $SiH_4$ | −3.46 | 47.8 |
| (11) Silane Chlorotrifluoro | $SiClF_3$ | 34.5 | 34.2 |
| (12) Silicon Tetra Fluoride | $SiF_4$ | −14 | 36.7 |
| (13) Sulfur Dioxide | $SO_2$ | 157.8 | 77.7 |
| (14) Sulfur Hexafluoride | $SF_6$ | 45.6 | 37.1 |
| (15) Water | $H_2O$ | 374.1 | 218.3 |
| (C) ORGANIC COMPOUNDS (examples) | | | |
| (a) Alkanes: | | | |
| 1. Methane | $CH_4$ | −82.1 | 45.8 |
| 2. Ethane | $C_2H_6$ | 32.2 | 48.2 |
| (3) Propane | $C_3H_8$ | 96.8 | 42 |
| (4) n-butane | $C_4H_{10}$ | 152 | 37.5 |
| (5) iso-butane | $C_4H_{10}$ | 134.7 | 35.9 |
| (b) Alkenes: | | | |
| 6. Ethene (Ethylene) | $C_2H_4$ | 9.9 | 50.5 |
| 7. Propene (Propylene) | $C_3H_6$ | 91.9 | 45.5 |
| 8. n-butene | $C_4H_8$ | 146 | 39.7 |
| (c) Alkynes: | | | |
| 9. Ethyne (acetylene) | $C_2H_2$ | 35.5 | 61.6 |
| (d) Alkyhalides: | | | |
| 10. Monofluoro Methane | $CH_3F$ | 44.6 | 58 |
| 11. Trifluoro Methane (Fluoroform) | $CHF_3$ | 25.9 | 46.9 |
| 12. Tetrafluoro Methane | $CF_4$ | −45.7 | 41.4 |
| 13. Monochlorodifluoro Methane | $CHClF_2$ | 96 | 48.5 |
| 14. Monochlorotrifluoro Methane | $CClF_3$ | 28.8 | 38.2 |
| 15. Dichlorodifluoro Methane | $CCl_2F_2$ | 111.5 | 39.6 |
| 16. Monobromotrifluoro Methane | $CBrF_3$ | 67 | 50.3 |
| 17. Monofluoro Ethane | $C_2H_5F$ | 102.2 | 49.6 |
| 18. Hexafluoro Ethane | $C_2F_6$ | 24.3 | — |
| 19. Chloropenatfluoro Ethane | $C_2ClF_5$ | 80 | — |
| 20. Perfluoro butane | $C_4F_{10}$ | 113.2 | 23 |
| 21. 1,1-difluro Ethylene | $C_2H_2F_2$ | 30.1 | — |

The materials which can be extracted using the processes described herein include, but are not limited to, complex lipids, such as acylglycerols, phosphoglycerides, sphingolipids and waxes; simple lipids, such as terpenes, pigments, steroids and their alcohols (sterols), prostaglandins, and so forth. Glycolipids, lipoproteins, membrane supramolecular complexes, and their metabolic intermediates, be they catabolic or anabolic, and metabolic products of these molecules, as well as molecules which behave in a fashion similar to lipids, may be obtained in a fashion similar to that given in Example 1.

Additional molecules may be obtained by the processes of this invention as well. For example "proteinaceous" substances, such as amino acid containing substances (including non-protein amino acids), oligopeptides, peptides, polypeptides, hormones, proteins, enzymes, antibodies, fractions and components of these, as well as metabolic intermediaries and products may be obtained. While the choice of SCF and reaction parameters will vary, depending upon the substance to be extracted, one skilled in the art will be able to determine which reagents and conditions to use.

Saccharides, including mono-, di-, oligo- and polysaccharides, as well as glycoproteins may be extracted in this way as well. Again, metabolic intermediaries and products can be obtained as well.

The nucleotide family of molecules, including purines and pyrimidines, and any molecules containing nucleic acid bases, nucleosides (ribonucleosides and deoxyribonucleosides), nucleic acids, supramolecular complexes of nucleic acids and proteins, viruses, and so forth as well as their intermediates and products, metabolic products may also be obtained.

In addition, materials not grouped into one of the "families" listed supra, may be obtained. These include all fat and/or water soluble vitamins, flavors, flavor potentiators, their intermediates, both catabolic and anabolic, and products as well.

It is not to be assumed that the method can be used only to obtain desired products. Undesirable substances, such as toxins, allergens, and so forth, may be removed from a sample, following this invention. Hence, one skilled in the art will note that this method has application for biological purification processes, where it is necessary to remove undesirable substances.

Various methods may be used to prepare the material used in the extraction process, including, but not limited to grinding, crushing, comminuting, high and low pressure pressing, cryogrinding, flaking, sonication, freezing, freeze-thaw treatment, freeze drying, emulsification, homogenization, filtration, high speed mixing, centrifugation, cell separation, mechanical separation, thermal treatment, and other physical treatments; chemical treatment such as treatment with inorganic and organic acids, bases, solvents, surface active agents, colorants, ionization radiation treatment; enzymatic treatment such as endogenous and/or exogenous enzymatic treatment, and any combination of more than one of the above methods of treating the sample.

The sample need not be treated prior to SCF extraction but may, e.g., be treated after extraction, when materials have already been removed from the sample. Further, one skilled in the art will see that different combinations of SCFs can be used in various applications of the general process. SCFs may be combined or may be used one after each other, in a sequence of steps.

In the practice of extraction using SCFs, various modifiers and/or extrainers are used to optimize extraction properties. These materials can enhance solubility, and improve selectivity and yields of extractions. Exemplary of such materials are water, alcohols, such as ethanol and n-propanol, ketones, such as acetones, and others.

As one skilled in the art will see, this method may be used in processes other than animal tissue extraction. It has applications to any area where separation of different components is desirable or necessary. For example, in experimental processes where separation of a mixture of polar and non-polar substances is difficult, extraction with SCF can accomplish this purification of biologicals, such as drugs and other pharmaceutical products, cosmetics, foodstuffs, vitamin products, and so forth, can also be performed using this method. On an industrial scale any and all chemical processes which require molecular separations can be accomplished using the method hereinbefore set forth and described.

While there have been described what are at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. A method of obtaining components of non-dried animal material comprising contacting said non-dried material to at least one supercritical fluid to extract said components into said supercritical fluid from said material and collecting said components from said supercritical fluid.

2. A method as in claim 1, wherein a plurality of supercritical fluids are used.

3. A method as in claim 1, wherein said components comprise lipid containing molecules.

4. A method as in claim 3 wherein said lipid containing molecules comprise complex lipids including acylglycerols, phosphoglycerides, sphingolipids, waxes, anabolic and catabolic intermediates and catabolic and anabolic products of complex lipid molecules.

5. A method as in claim 3, wherein said lipid containing molecules comprise simple lipids including terpenes, pigments, steriods, sterols, prostaglandins, catabolic and anabolic intermediates and catabolic and anabolic products of said simple lipids.

6. A method as in claim 3, wherein said lipid containing molecules comprise glycolipids, lipoproteins, cell membrane supramolecular complexes, catabolic and anabolic intermediates and catabolic and anabolic products of said lipid containing molecules.

7. A method as in claim 1, wherein said method comprises removing undesirable components from a sample.

8. A method as in claim 7, wherein said components comprise toxins.

9. A method as in claim 1, wherein said components comprise molecules soluble in organic solvents.

10. A method as in claim 1, wherein said components comprise molecules soluble in inorganic solvents.

11. A method as in claim 1, wherein said animal material comprises animal tissue.

12. A method as in claim 1, wherein said animal material comprises cells.

13. A method as in claim 1, wherein said animal material comprises exudates.

14. A method as in claim 1, wherein said animal material comprises organs.

15. A method as in claim 1, wherein said animal material comprises internal organs.

16. A method as in claim 1, wherein said animal material comprises nerve tissue.

17. A method as in claim 1, wherein said animal material comprises muscle tissue.

18. A method as in claim 1, wherein said animal material comprises adipose tissue.

19. A method as in claim 1, wherein said animal material comprises cartiligenous tissue.

20. A method as in claim 1, wherein said animal material comprises glandular tissue.

21. A method as in claim 1, wherein said animal material comprises epithelial tissue.

22. A method as in claim 1, wherein said animal material comprises endothelial tissue.

23. A method as in claim 1, wherein said animal material comprises myocardial tissue.

24. A method as in claim 1, wherein said animal material comprises vascular tissue.

25. A method as in claim 1, wherein said animal material comprises circulatory tissue.

26. A method as in claim 1, wherein said animal material comprises lymphatic tissue.

27. A method as in claim 1, wherein said animal material comprises respiratory tissue.

28. A method as in claim 1, wherein said animal material comprises digestive tissue.

29. A method as in claim 1, wherein said animal material comprises skeletal tissue.

30. A method as in claim 1, wherein said animal material comprises sensory tissue.

31. A method as in claim 1, wherein said animal material comprises urinary tissue.

32. A method as in claim 1, wherein said animal material comprises reproductive tissue.

33. A method as in claim 1, wherein said supercritical fluid is a gas.

34. A method as in claim 33, wherein said gas is an elemental gas.

35. A method as in claim 33, wherein said elemental gas is an inert gas.

36. A method as in claim 33, wherein said gas contains carbon.

37. A method as in claim 36, wherein said gas is carbon dioxide.

38. A method as in claim 36, wherein said gas is an alkane gas.

39. A method as in claim 36, wherein said gas is an alkene gas.

40. A method as in claim 36, wherein said gas is an alkyne gas.

41. A method as in claim 33, wherein said gas is a noble gas.

42. A method as in claim 33, wherein said gas is a nitrogen containing gas.

43. A method as in claim 42, wherein said gas is selected from the group consisting of ammonia, nitric oxide, nitrogen dioxide, and nitrous oxide.

44. A method as in claim 33, wherein said gas contains silicon.

45. A method as in claim 44, wherein said gas is selected from the group consisting of silane, chlorotrifluorosilane, and tetrafluoro silane.

46. A method as in claim 33, wherein said gas contains sulfur.

47. A method as in claim 46, wherein said gas is selected from the group consisting of sulfur dioxide and sulfur hexafluoride.

48. A method as in claim 33, wherein said gas contains hydrogen.

49. A method as in claim 33, wherein said gas contains halogen.

50. A method as in claim 33, wherein said gas is water vapor.

51. A method as in claim 1, wherein said method further comprises adding a modifier or entrainer to said supercritical fluid.

52. A method as in claim 51, wherein said modifier or entrainer is water.

53. A method as in claim 51, wherein said modifier or entrainer is an alcohol.

54. A method as in claim 53, wherein said alcohol is ethanol.

55. A method as in claim 53, wherein said alcohol is n-propanol.

56. A method as in claim 51, wherein said modifier or entrainer is a ketone.

57. A method as in claim 56, wherein said ketone is acetone.

* * * * *